(12) United States Patent
Yoshida et al.

(10) Patent No.: US 7,425,518 B2
(45) Date of Patent: Sep. 16, 2008

(54) LEAD-FREE GLASS MATERIAL FOR USE IN SEALING AND, SEALED ARTICLE AND METHOD FOR SEALING USING THE SAME

(75) Inventors: Masahiro Yoshida, Kagoshima (JP);
Yasuo Hatate, Kagoshima (JP);
Tsugumitsu Sarata, Kagoshima (JP);
Yoshimitsu Uemura, Kagoshima (JP);
Tomoyuki Honda, Kagoshima (JP);
Hiroyuki Fukunaga, Kagoshima (JP);
Masahiro Iwashita, Kagoshima (JP)

(73) Assignee: Yamato Electronic Co., Ltd. (JP)

( * ) Notice: Subject to any disclaimer, the term of this patent is extended or adjusted under 35 U.S.C. 154(b) by 121 days.

(21) Appl. No.: 11/158,258

(22) Filed: Jun. 21, 2005

(65) Prior Publication Data
US 2005/0233885 A1 Oct. 20, 2005

Related U.S. Application Data

(63) Continuation of application No. PCT/JP03/08263, filed on Jun. 27, 2003.

(30) Foreign Application Priority Data
Feb. 19, 2003 (JP) ............................. 2003-041695

(51) Int. Cl.
*C03C 8/24* (2006.01)
*C03C 8/00* (2006.01)
*C03C 8/02* (2006.01)
*C03C 8/16* (2006.01)

(52) U.S. Cl. .............................. 501/15; 501/17; 501/21; 501/26; 501/32

(58) Field of Classification Search .................. 501/15, 501/17, 21, 26, 32
See application file for complete search history.

(56) References Cited

U.S. PATENT DOCUMENTS

| | | | |
|---|---|---|---|
| 3,294,508 A | 12/1966 | Anderson et al. | |
| 3,534,209 A | 10/1970 | Anderson et al. | |
| 4,342,943 A * | 8/1982 | Weaver | 313/479 |
| 4,748,137 A * | 5/1988 | Nigrin | 501/46 |
| 5,013,360 A * | 5/1991 | Finkelstein et al. | 106/1.23 |
| 5,051,381 A * | 9/1991 | Ohji et al. | 501/26 |
| 5,188,990 A * | 2/1993 | Dumesnil et al. | 501/19 |
| 5,246,890 A | 9/1993 | Aitken et al. | |

(Continued)

FOREIGN PATENT DOCUMENTS

JP 60-255643 A * 12/1985

(Continued)

*Primary Examiner*—Anthony J Green
(74) *Attorney, Agent, or Firm*—Schweitzer Cornman Gross & Bondell LLP

(57) ABSTRACT

Provided with a glass composition including a network-former oxide composed of any one of or both of $B_2O_3$ and $V_2O_5$ of 20-80% by weight, ZnO of 0-60% by weight and BaO of 0-80% by weight, wherein at least one of ZnO and BaO is included as an essential ingredient. The present invention is a glass material for use in sealing, which is of lead-free series, can be used for sealing at a low processing temperature and within a wide temperature range, has a low thermal expansion coefficient, superior adhesion, superior sealing processability, superior adherence, superior chemical stability, superior strength and the like and comprises sufficient practical performance to substitute for lead glass.

8 Claims, 9 Drawing Sheets

U.S. PATENT DOCUMENTS

| | | | |
|---|---|---|---|
| 5,252,521 A | * 10/1993 | Roberts | 501/17 |
| 5,281,560 A | 1/1994 | Francis et al. | |
| 5,306,674 A | * 4/1994 | Ruderer et al. | 501/20 |
| 5,326,591 A | * 7/1994 | Roberts | 427/162 |
| 5,336,644 A | * 8/1994 | Akhtar et al. | 501/15 |

FOREIGN PATENT DOCUMENTS

| | | |
|---|---|---|
| JP | 04-114929 | 4/1992 |
| JP | 06-263478 A * | 9/1994 |
| JP | 08-180837 | 7/1996 |
| JP | 08-183632 | 7/1996 |
| JP | 09-175833 | 7/1997 |
| JP | 09-188544 | 7/1997 |
| JP | 09-227154 | 9/1997 |
| JP | 09-278483 | 10/1997 |
| JP | 10-236842 | 9/1998 |
| JP | 2000-113820 | 4/2000 |
| JP | 2000-128574 | 5/2000 |
| JP | 2000-264676 | 9/2000 |
| JP | 2000-327370 | 11/2000 |
| JP | 2001-058844 | 3/2001 |
| JP | 2003-26444 A * | 1/2003 |
| JP | 2003-34550 A * | 2/2003 |
| JP | 2003-192378 | 7/2003 |
| JP | 2003-241048 | 8/2003 |

* cited by examiner

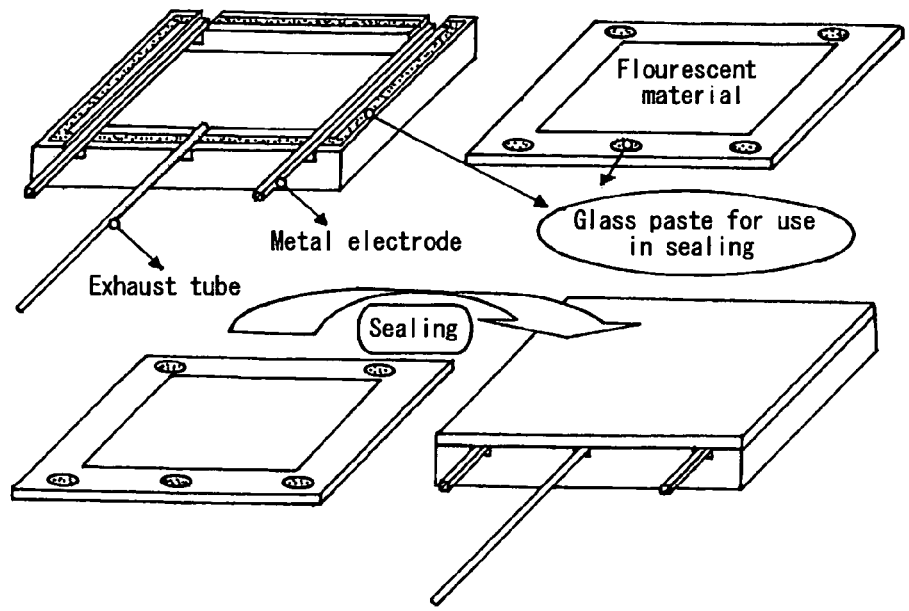
FIG.11
(a)
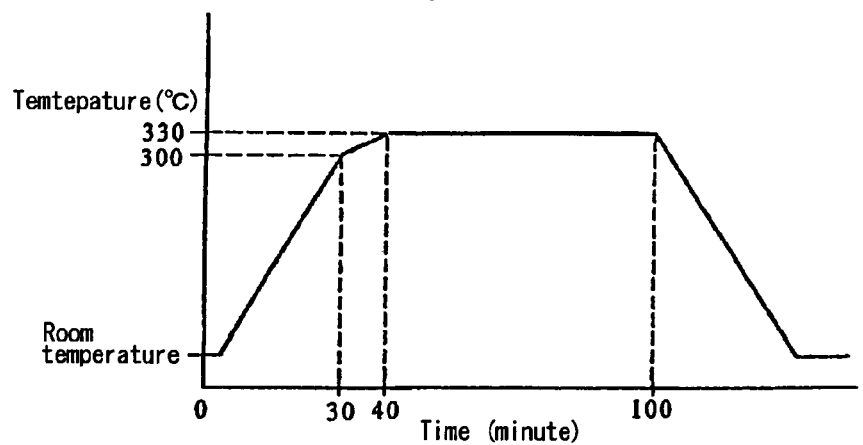
(b)
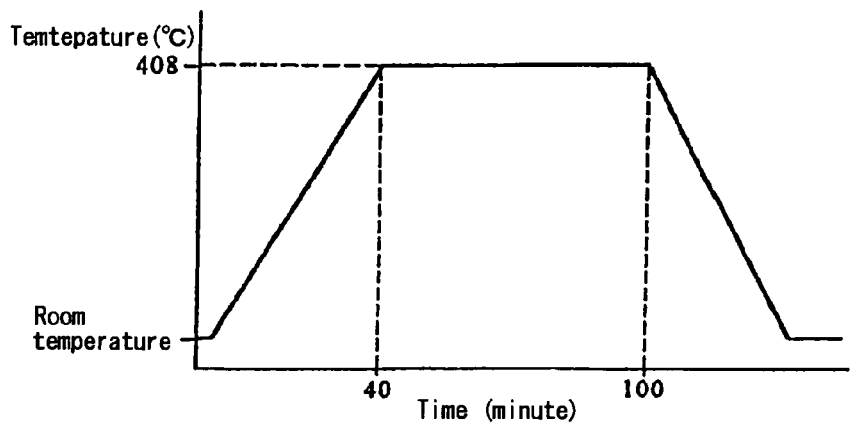

LEAD-FREE GLASS MATERIAL FOR USE IN SEALING AND, SEALED ARTICLE AND METHOD FOR SEALING USING THE SAME

RELATED APPLICATIONS

This is a continuation of International Patent Application No. PCT/JP03/08263, filed Jun. 27, 2003, which claims the benefit of Japanese Patent Application No. 2003-041695, filed Feb. 19, 2003.

TECHNICAL FIELD

The present invention relates to a lead-free glass material for use in sealing, which is used for sealing of an opening or a joint in various kinds of electronic components or electronic products such as an electron tube, a fluorescent display panel, a plasma display panel and a semi conductor package, and to a sealed matter and a sealing method using the lead-free glass material.

BACKGROUND ART

As a general trend, a glass material for use in sealing is used for sealing of various kinds of electronic products which are used with the inside thereof being kept in a high vacuum and for sealing of electronic component packages for preventing entering of corrosive gas or moisture in order to ensure the operation stability. This glass material for use in sealing is made of low-melting glass powder, and a glass continuous layer having glass powder fused thereon is formed by pasting the powder with organic binder solution, coating a sealed portion of an article to be sealed with the pasted powder and burning the article in an electric furnace or the like to strip a vehicle ingredient.

Conventionally, mainly lead glass powder of PbO—$B_2O_3$ series is widely used as such a glass material for use in sealing. That is, lead glass having a low melting point and ease of melting of PbO can be used for sealing at a low processing temperature and within a wide temperature range, and lead glass having low thermal expansion, superior adhesion, superior adherence, superior chemical stability and the like provides advantages of high sealing property, high sealing strength and high durability.

However, since lead is a toxic substance, there is an occupational safety and health problem in a manufacturing step of lead glass, and there is a concern about how to deal with disposal of electronic components or electronic products, since disposal of untreated electronic components or electronic products at the end of life usefulness for which lead glass was used for sealing could cause soil contamination or groundwater contamination due to lead being eluted by acid rain or the like and disposal by landfill or the like is prohibited under recent strict environmental regulations while limited application due to inclusion of lead makes recycling difficult.

Suggested measures for such problems are: to use low-leaded glass including Pb of 10-23% for a stem mount or the like for sealing a glass valve (Japanese Unexamined Patent Publication No. 8-180837); and to provide a groove for preventing entry of etchant at a front plate and a back plate of a plasma display panel on the inner side of a marginal lead glass sealing portion, dip the plasma display panel at the end of life usefulness into etchant to remove lead glass of a sealing material selectively and repair a deteriorated portion for recycling (Japanese Unexamined Patent Publication No. 2000-113820). However, fundamental measures cannot be obtained since toxic lead is still included in the waste product even though the amount of lead can be decreased by using low-leaded glass as in the former method. Moreover, with the latter method of removing the lead glass sealing portion by etching, the amount of labor and costs required for the removing process causes a decrease in the advantage of recycling, and the method also has a cost disadvantage in a manufacturing stage due to formation of the groove.

Against this background, development of a glass material for use in sealing of lead-free series which can substitute a conventional general-purpose lead glass series has been strongly demanded. However, although $TiO_2$ series, $P_2O_5$ series and the like have been reported as lead-free low-melting glass, none of them, even having a low melting point, offers performance comparable to lead glass in terms of sealing processability, thermal expansion coefficient, adhesion, adherence, chemical stability, strength and the like, and therefore they are a long way off from practical use and have not progressed past basic research at the present stage.

With a view toward the above situation, an object of the present invention is to provide a glass material for use in sealing, which is lead-free, can be used for sealing at a low processing temperature and within a wide temperature range, has a low thermal expansion coefficient, superior adhesion, superior sealing processability, superior adherence, superior chemical stability, superior strength and the like and comprises sufficient practical performance to substitute lead glass.

DISCLOSURE OF THE INVENTION

In order to achieve the above object, the present inventors focused attention on the fact that the constituents of glass (amorphous) are divided into three kinds of a network-former oxide (Network former: NWF) which forms a three-dimensional network structure that is the basic skeleton of glass, a network-modifier oxide (Network modifier: NWM) which cannot form glass by itself but gets into the three-dimensional network structure and affects the glass property and an intermediate oxide (Intermediate) which cannot form glass by itself but may be involved in network formation instead of a part of the network-former oxide or may serve as the network-modifier oxide, and first selected $B_2O_3$ and $V_2O_5$ as the network-former oxide, selected ZnO, which exhibits behavior similar to that of PbO in the glass structure, has glass forming ability depending on single-bond strength with oxygen close to that of PbO and has the same dissociation energy per mol and coordination number as those of PbO, as an alternative ingredient for PbO of a conventional lead glass for use in sealing, from an extremely large number of oxides which function as intermediate oxides or network-modifier oxides and further selected BaO as a network-modifier oxide.

Then, in order to check the suitability of a lead-free glass including these oxides as the basis ingredient, i.e. glass of $B_2O_3$ and/or $V_2O_5$—ZnO—BaO series, as a glass material for use in sealing, the inventors set a variety of combinations of the respective ingredients and the compounding ratio to evaluate various kinds of physico-chemical characteristics by close experimental work and continued discussions from a variety of angles and, as a result, found a composition comprising sufficient practicality as a lead-free glass material for use in sealing, sought out a composition further having superior sealing processability and a higher practical value which can be obtained by adding other specific ingredients to the basic ingredient, and thus made the present invention.

That is, a lead-free glass material for use in sealing according to the present invention has a glass composition including a network-former oxide composed of any one of or both of $B_2O_3$ and $V_2O_5$ of 20-80% by weight, ZnO of 0-60% by weight and BaO of 0-80% by weight, wherein at least one of ZnO and BaO is included as an essential ingredient, which provides a glass material for use in sealing, which has a lead-free glass composition, can be used for sealing at a low temperature and within a wide temperature range, offers preferable adhesion and adherence with respect to a sealed portion, rarely causes generation of flaking or a crack at a sealing portion and offers superior chemical stability and strength of a sealing glass layer and preferable durability of the sealing portion.

Moreover, the invention comprises a lead-free glass material for use in sealing, which has a glass composition composed of $B_2O_3$ of 20-80% by weight, ZnO of 0-50% by weight and BaO of 0-60% by weight, which provides a lead-free glass material for use in sealing of, in particular, $B_2O_3$—ZnO—BaO series, which offers a preferable glass state and a high glass recovery percentage.

The invention may have a glass composition composed of $B_2O_3$ of 20-40% by weight, ZnO of 0-50% by weight and BaO of 10-60% by weight, which provides the above lead-free glass material for use in sealing of $B_2O_3$—ZnO—BaO series, which has a low glass transition point, can be used for sealing at a lower temperature, can reduce the thermal effect on an article to be sealed and can reduce the thermal energy consumption.

The invention may also be constructed to have a glass composition composed of $B_2O_3$ of 20-35% by weight, ZnO of 10-35% by weight and BaO of 40-60% by weight, respectively, which provides the above lead-free glass material for use in sealing of $B_2O_3$—ZnO—BaO series, which has an especially low glass transition point, offers superior thermal stability as glass and comprises high suitability as a sealing material.

Furthermore, a lead-free glass material for use in sealing according to the invention has a glass composition including any one of or both of $TeO_2$ and $Bi_2O_3$ of 50-500 part by weight compounded for an oxide having the glass composition according to any one of the above glass materials of the total amount of 100 part by weight, which provides the above lead-free glass material for use in sealing of $B_2O_3$—ZnO—BaO series, which includes at least one of $TeO_2$ and $Bi_2O_3$ as the fourth ingredient compounded at a specific range, so that the fluidity in a molten state and the thermal stability as glass are enhanced drastically and the glass transition point and the softening point further lower and, therefore, extremely superior sealing processability is obtained and ideal performance as a glass material for use in sealing can be offered.

On the other hand, the invention comprises a lead-free glass material for use in sealing, which has a glass composition composed of $V_2O_5$ of 30-80% by weight, ZnO of 0-50% by weight and BaO of 10-60% by weight, which provides a lead-free glass material for use in sealing of, in particular, $V_2O_5$—ZnO—BaO series which has a low glass transition point and offers a preferable glass state and a high glass recovery percentage. Moreover, since the glass itself is of greenish black, there is the advantage that coloring, which is required for a conventional lead glass material, can be omitted.

The invention of may also comprise a glass composition composed of $V_2O_5$ of 25-75% by weight, ZnO of 0-45% by weight and BaO of 15-55% by weight, which provides a lead-free glass material for use in sealing of $V_2O_5$—ZnO—BaO series, which has a low crystallization starting temperature, a low glass transition point and a low softening point and offers extremely preferable sealing processability.

Moreover, a lead-free glass material for use in sealing according to the invention has a glass composition including any one of or both of $TeO_2$ and $Bi_2O_3$ of 1-60 part by weight compounded for an oxide having the glass composition according to the above compositions of the total amount of 100 part by weight, which also provides a lead-free glass material for use in sealing of $V_2O_5$—ZnO—BaO series, which includes at least one of $TeO_2$ and $Bi_2O_3$ as the fourth ingredient compounded at a specific range, so that the fluidity in a molten state and the thermal stability as glass are enhanced drastically and the glass transition point and the softening point further lower and, therefore, extremely superior sealing processability is obtained, ideal performance as a glass material for use in sealing can be offered along with a manufacturing cost advantage.

Furthermore, a lead-free glass material for use in sealing according to the invention includes a refractory filler mixed with glass powder having the glass composition according to any one of the above compositions, which provides a lead-free glass material for use in sealing, which includes a refractory filler, so that the thermal expansion characteristic can be easily adjusted in accordance with the material of a sealed portion and sealing glass having high strength is offered.

The invention employs a structure wherein the refractory filler is low-expansion ceramic powder and the compounding quantity thereof is smaller than or equal to 150 part by weight for glass powder of 100 part by weight, which provides a lead-free glass material for use in sealing including the refractory filler, by which adjustment of the thermal expansion characteristic according to the material of a sealed portion can be performed more easily.

A lead-free glass material for use in sealing according to the invention is composed of glass powder having the glass composition according to any one of the above compositions, or mixture powder paste including a refractory filler added to said glass powder, which provides a lead-free glass material for use in sealing including the refractory filler, which can be easily applied to a sealed portion of an article to be sealed in a paste form.

A sealed matter according to the invention employs a glass-based, ceramic-based or metal-based structure having an opening and/or a joint sealed with the lead-free glass material for use in sealing according to any one of the above compositions, which provides a sealed matter, which is sealed with the lead-free glass material for use in sealing, so that a sealing portion having superior reliability is offered.

Moreover, the invention specifies a vacuum package, as the sealed matter, having the inside thereof being kept in a high vacuum, which provides a vacuum package such as a fluorescent display panel which has a sealing portion having superior reliability.

Moreover, a sealing method according to the invention is characterized in that a lead-free glass material for use in sealing composed of the above paste is applied to a sealed portion of an article to be sealed, tentative burning is performed for this article at around the softening point of the lead-free glass included in the paste and then main burning is performed at around the crystallization starting temperature of the lead-free glass.

With the sealing method according to the invention, since a sealed portion of an article to be sealed is coated with a lead-free glass material for use in sealing composed of the above paste, tentative burning is performed for this article at around the softening point of the lead-free glass included in the paste and then main burning is performed at around the crystallization starting temperature of the lead-free glass, it is possible to prevent generation of a pinhole due to deaeration or an air bubble in a sealing glass layer and, therefore, it is possible to enhance the reliability of sealing and the strength of the sealing portion.

Moreover, the invention comprises the above sealing method, wherein the tentative burning is performed within a temperature range between the softening point minus 10° C. and the softening point plus 40° C. and the main burning is performed within a temperature range between the crystallization starting temperature minus 20° C. and the crystallization starting temperature plus 50° C. Since the tentative burning and the main burning in the above sealing method are performed within specific temperature ranges, there is the advantage that a more preferable sealing quality is obtained.

BRIEF DESCRIPTION OF THE DRAWINGS

FIG. 10 is a perspective view showing a sealing method of a plate glass by Sealing Test 2.

FIG. 11 shows temperature profiles of burning in Sealing Test 2 and, in particular, (a) is a correlation diagram of temperature-time of tentative burning and (b) is a correlation diagram of temperature-time of main burning.

BEST MODE FOR CARRYING OUT THE INVENTION

Figure 1:
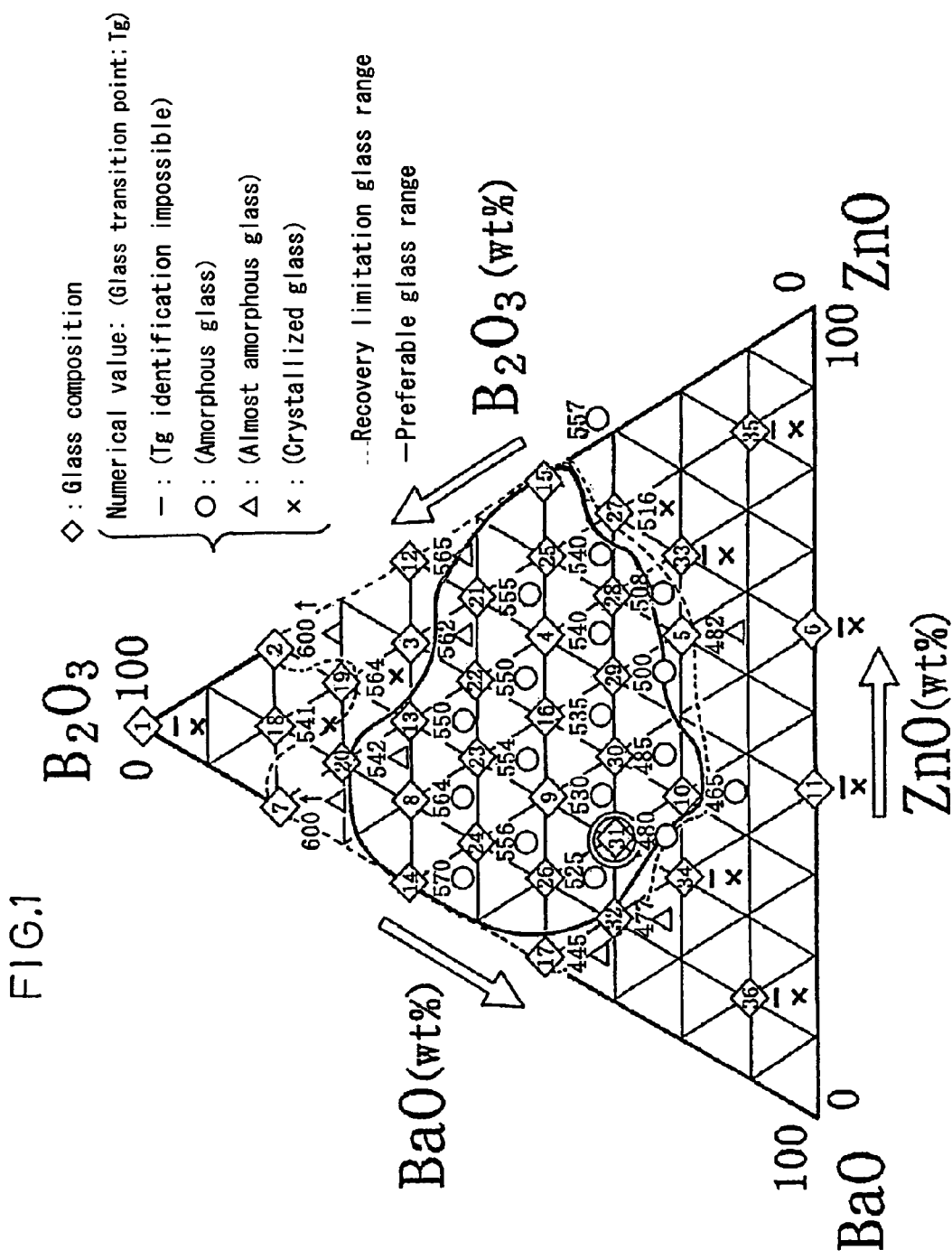
FIG. 1 is a triangle diagram showing the glass compositions of lead-free glass materials of $B_2O_3$—BaO—ZnO series manufactured in Example 1 together with the glass transition points and the vitrification states.

A lead-free glass material for use in sealing according to the present invention is basically lead-free glass of $B_2O_3$ and/or $V_2O_5$—ZnO—BaO series and has a glass composition including, as described above, a network-former oxide composed of any one of or both of $B_2O_3$ and $V_2O_5$ of 20-80% by weight, ZnO of 0-60% by weight and BaO of 0-80% by weight, wherein at least one of ZnO and BaO is included as an essential ingredient. With this lead-free glass material for use in sealing having the above glass composition, a sealing process can be performed at a low temperature and within a wide temperature range, preferable adhesion and preferable adherence for a sealed portion composed of glass, ceramic, metal or the like of an article to be sealed are obtained, flaking or a crack is rarely generated at a sealing portion since the thermal expansion coefficient is small and the thermal expansion characteristic can be easily adjusted to that of a sealed portion, and a sealing glass layer having superior chemical stability and superior strength and a sealing portion having preferable durability are realized.

Although both of $B_2O_3$ and $V_2O_5$ may be used as the network-former oxide, glass having further superior performance as a lead-free glass material for use in sealing can be prepared more easily when any one of them is singularly used. That is, regarding two series of $B_2O_3$—ZnO—BaO series and $V_2O_5$—ZnO—BaO series, a lead-free glass material for use in sealing offering further high performance can be prepared respectively.

First, a lead-free glass material for use in sealing of $B_2O_3$—ZnO—BaO series preferably has a glass composition composed of $B_2O_3$ of 20-80% by weight, ZnO of 0-50% by weight and BaO of 0-60% by weight and including at least one of ZnO and BaO as an essential ingredient. With such a glass composition, a preferable glass state is obtained by melting as shown in a sealing test of the following example and a preferable glass recovery percentage, i.e. an yield of glass by melting of oxide powder which is the material, is obtained.

It should be noted that it is known that the glass transition point Tg tends to lower at the above glass composition range as the content of BaO is increased. This is attributed to the fact that BaO modifies the network structure by cutting the oxygen bridge in glass having the network structure of $B_2O_3$, causing a decrease in the degree of polymerization of the network structure. On the other hand, the glass transition point Tg does not tend to lower even when the content of ZnO is increased, and it is presumed in view of this that ZnO within this glass composition range functions more as network-former oxide than as network-modifier oxide.

From the aspect of lowering of the glass transition point Tg, recommended as a more suitable lead-free glass material for use in sealing is one having a glass composition composed of $B_2O_3$ of 20-40% by weight, ZnO of 0-50% by weight and BaO of 10-60% by weight. That is, with this glass composition, there are advantages that the glass transition point Tg lowers to smaller than or equal to 540° C., a sealing process can be performed at a temperature which is lower by that much, the thermal effect on an article to be sealed can be decreased and the thermal energy consumption can be reduced.

Furthermore, the most favorable lead-free glass material for use in sealing has a glass composition composed of $B_2O_3$ of 20-35% by weight, ZnO of 10-35% by weight and BaO of 40-60% by weight. With such a lead-free glass material, the glass transition point Tg becomes smaller than 500° C., a sealing process can be performed at a lower temperature and a difference $\Delta T$ between the crystallization starting temperature Tx and the glass transition point Tg is increased and, therefore, the thermal stability as glass is enhanced and performance equivalent to that of a conventional general-purpose lead glass material for use in sealing is obtained.

With a glass composition further including at least one of $TeO_2$ and $Bi_2O_3$ as the fourth ingredient added to the above glass composition of $B_2O_3$—ZnO—BaO series, the fluidity in a molten state and the visual appearance as glass become preferable, the glass transition point Tg and the softening point Tf lower and $\Delta T$ (Tx−Tg) which gives an indication of the thermal stability is increased drastically and, therefore, extremely superior sealing processability is offered and ideal performance as a glass material for use in sealing is provided.

With such a glass composition including the added fourth ingredient, it is preferable to compound any one of or both of $TeO_2$ and $Bi_2O_3$ of 50-500 part by weight for an oxide having the above glass composition (including two-component system which does not have one of ZnO and BaO) of $B_2O_3$—ZnO—BaO series of the total amount of 100 part by weight. A practical effect cannot be obtained when the compounding quantity is smaller than 50 part by weight. On the contrary, when the compounding quantity is larger than 500 part by weight, the fluidity in a molten state becomes too high and the form retention of the sealing glass layer deteriorates, causing deformation or drooping due to the gravity more often.

On the other hand, a lead-free glass material for use in sealing of $V_2O_5$—ZnO—BaO series preferably has a glass composition composed of $V_2O_5$ of 30-80% by weight, ZnO of 0-50% by weight and BaO of 10-60% by weight. With such a glass composition, a preferable glass state is also obtained by melting, a preferable glass recovery percentage is offered, coloring which is performed for a conventional general-purpose lead glass sealing material becomes unnecessary since the glass itself is of greenish black, the manufacturing processes are simplified by that much and the manufacturing cost can be reduced. That is, lead glass which is transparent and colorless is colored black by compounding, in general, coloring material such as carbon black in order to facilitate the quality check of the sealing state by eyesight or an optical sensor and to give discrimination necessary for removing a sealing glass portion including toxic lead in a disposal process of a sealing product. On the other hand, although it is needless to remove a nontoxic lead-free glass material for use in sealing of the present invention in a disposal process of a sealing product, the quality check of the sealing state can be performed with no difficulty since the glass itself is colored.

Regarding this lead-free glass material for use in sealing of $V_2O_5$—ZnO—BaO series, a more suitable glass composition is composed of $V_2O_5$ of 25-75% by weight, ZnO of 0-45% by weight and BaO of 15-55% by weight, whereby the crystallization starting temperature Tx is as low and lower than or equal to 500° C., the glass transition point Tg and the softening point Tf are as low and lower than or equal to 400° C. whereby extremely preferable sealing processability is obtained.

Moreover, with a glass composition including at least one of $TeO_2$ and $Bi_2O_3$ further added as the fourth ingredient to this glass composition of $V_2O_5$—ZnO—BaO series, preferable fluidity in a molten state and preferable visual appearance as glass are offered, the glass transition point Tg and the softening point Tf lower and $\Delta T$ (Tx−Tg) which gives an indication of the thermal stability is increased and, therefore, extremely superior sealing processability is offered and ideal performance as a glass material for use in sealing is provided.

Regarding such a glass composition including the added fourth ingredient, it is preferable to compound any one of or both of $TeO_2$ and $Bi_2O_3$ of 1-60 part by weight for an oxide having the above glass composition (including two-component system which does not have ZnO) of $V_2O_5$—ZnO—BaO series of the total amount of 100 part by weight. A practical effect cannot be obtained when the compounding quantity is smaller than 1 part by weight and, on the contrary, there is a problem that the form retention of the sealing glass layer deteriorates due to excess fluidity in a molten state when the compounding quantity is larger than 60 part by weight. It should be noted that a case where $TeO_2$ and $Bi_2O_3$ are added to this glass composition of $V_2O_5$—ZnO—BaO series is cost advantageous, since the required compounding quantity is dramatically smaller than a case where $TeO_2$ and $Bi_2O_3$ are added to the above glass composition of $B_2O_3$—ZnO—BaO series as shown in the above compounding quantity range and the usage of $TeO_2$ and $Bi_2O_3$ which are expensive materials can be decreased.

Meanwhile, in a sealing process with a glass material, the terminal expansion characteristic of a sealing glass portion and that of a sealed portion of an article to be sealed preferably coincide in order to prevent generation of flaking and a crack at the sealing portion and to realize a reliable sealing state. In view of this, since a lead-free glass material for use in sealing of the present invention has a small thermal expansion coefficient as described above, the thermal expansion characteristic coincides without adjustment depending on the material of a sealed portion, the adjustable width of the thermal expansion coefficient by compounding the refractory filler is wide since the glass material offers preferable fluidity in a fluid state, and the number of materials which can be sealed is increased by that much.

It should be noted that the refractory filler has an effect of decreasing the thermal expansion coefficient of a glass material for use in sealing and an effect of enhancing the strength of the sealing glass. Although any one having a melting point higher than that of glass of the sealing material may be used as such a refractory filler and there is no special limitation of the kind, it is suitable to use low-expansion ceramic powder such as cordierite, zirconyl phosphate, β-eucryptite, β-spodumene, zircon, alumina, mullite, silica, β-quartz solid solution, zinc silicate or aluminum titanate. The compounding quantity of such a refractory filler is preferably smaller than or equal to 150 part by weight for glass powder having the above glass composition of 100 part by weight, and the original characteristic of the glass composition is hampered and the performance as a glass material for use in sealing lowers when the compounding quantity is too large.

In order to manufacture a lead-free glass material for use in sealing of the present invention, it is only necessary to put an oxide powder mixture which is the material into a container such as a platinum crucible, melt and vitrify the mixture by burning the same in a furnace such as an electric furnace for a predetermined time period, cast the molten material into an appropriate formwork such as an alumina boat and cool the same, and grind the obtained glass block to an appropriate grain size with a grinding machine. The refractory filler may be mixed by adding the same while grinding the above glass block or by adding the same to glass powder after grinding. Moreover, instead of the method of preliminarily melting and vitrifying all ingredients in a mixed state, it is possible to employ a so-called masterbatch method of melting and vitrifying an oxide which is the material excluding a partial ingredient, e.g. $TeO_2$ or $Bi_2O_3$ when added and compounded, mixing powder of the excluded ingredients into the grinded material, melting and vitrifying the mixture by the second burning and grinding the same again. It should be noted that the grain size of the glass powder is preferably within a range of 0.05-100 μm and the coarse particles generated in the grinding may be classified and removed.

A lead-free glass material for use in sealing of the present invention is composed of glass powder having the specific glass composition described above or of powder mixture including a refractory filler compounded into the glass powder, and the powder to be generally applied to a sealed portion in a sealing process as paste is dispersed at high concentration including the powder in organic binder solution may be commercialized in the form of prepared paste.

Although there is no special limitation, the organic binder solution to be used for the paste may be prepared by, for example, dissolving cellulose binder such as cellulose nitrate or ethylcellulose in solvent such as pine oil, butyl diglycol acetate, aromatic hydrocarbons solvent or mixed solvent such as thinner, or dissolving acrylic resin binder in solvent such as ketone, ester or a low-boiling aromatic one. The viscosity of the paste is preferably within a range of 100-2000 dPa·s from the aspect of coating activity.

A sealing process may be performed by coating a sealed portion of an article to be sealed with a lead-free glass material composed of the above paste for use in sealing and burning the article in a furnace such as an electric furnace to melt and unite glass powder and form a sealing glass layer. Although this burning can be performed at one time, the burning is preferably performed by two stages of tentative burning and main burning in order to enhance the sealing quality. That is, in the two-stages burning, a sealed portion of an article to be sealed is first coated with paste of a lead-free glass material for use in sealing, tentative burning is performed for this coated article at around the softening point of the lead-free glass included in the paste, so that the vehicle ingredient (binder and solution) of the paste is stripped and thermally decomposed with only the glass ingredient remaining, and main burning is then performed at around the crystallization starting temperature of the lead-free glass to form a sealing glass layer in which the glass ingredient is completely molten and united.

With such two-stages burning, since the vehicle ingredient is stripped and removed at the stage of tentative burning and the glass ingredients are fused with each other in main burning, it is possible to prevent generation of a pinhole due to deaeration and an air bubble in the sealing glass layer and, therefore, it is possible to enhance the reliability of sealing and the strength of the sealing portion. Moreover, in a case where an article to be sealed requires sealing and junction of a plurality of members such as a vacuum package or requires sealing and fixation of sealed portions with an electrode, lead wire, an exhaust tube or the like being sandwiched therebetween, the tentative burning is performed for each member before assembling, members taken out of a furnace are assembled into the form of a product and main burning may be performed in this assembly state.

It should be noted that the temperature range which is especially suitable for tentative burning is between the softening point minus 10° C. and the softening point plus 40° C. and the temperature range which is especially suitable for main burning is between the crystallization starting temperature minus 20° C. and the crystallization starting temperature plus 50° C. Moreover, it is preferable to perform tentative burning at a slow rate of temperature rise in order to separate an air bubble generated inside from the layer reliably and, in particular, at approximately 0.1-30° C./min from room temperature to around the glass transition point and at approximately 0.1-10° C./min from around the glass transition point to around the softening point temperature. On the other hand, it is preferable in main burning to increase the temperature at approximately 0.1-50° C./min from room temperature to around the crystallization starting temperature and keep a constant temperature at around the crystallization starting temperature.

Although there is no special limitation for an object for which a sealing process by a lead-free glass material for use in sealing of the present invention is applied and a variety of glass-based, ceramic-based or metal-based articles to be sealed for use in various kinds of electronic components or electronic products such as an electron tube, a fluorescent display panel, a plasma display panel or a semiconductor package or a wide field other than electronic/electric field are embraced, the present invention is especially superior in applicability to an article to be sealed which requires high sealing property such as a vacuum package having the inside thereof being kept in a high vacuum higher than or equal to $10^{-6}$ Torr such as a fluorescent display panel or an electron tube.

EXAMPLES

The following description will explain the present invention concretely using examples. It should be noted that all of the material oxides used in the following examples are reagent chemicals made by Wako Pure Chemical Industries and other analysis reagent and the like used are similarly reagent chemicals.

Example 1

A mixture (total amount of 15 g) of $B_2O_3$ powder, ZnO powder and BaO powder as the material oxide at a ratio (% by weight) described in the following Table 1 was housed in a platinum crucible and burned in an electric furnace at approximately 1000° C. for 60 minutes, the molten material was cast into an alumina boat to create a glass rod, the glass rod was cooled in the atmosphere, then grinded with a stamp mill (ANS 143 made by Nitto Kagaku Co., Ltd) and classified to collect powder having a grain size smaller than or equal to 100 μm, and lead-free glass materials B1-B32 were manufactured.

[Glass Recovery Percentage and Visual Appearance Property]

In the lead-free glass material manufactured in the above Example 1, the glass recovery percentage was measured on the basis of the yield of casting of a molten material from the platinum crucible into the alumina boat and the visual appearance property of the molten material was checked. The results are shown in Table 1 together with the compounding ratio of the material oxide. It should be noted that the glass recovery percentage is % by weight of an alumina boat inflow to the total weight after burning and the rest corresponds to the amount of what remained in the platinum crucible. Moreover, non-molten in the table represents a material oxide which did not melt during burning and remained in the platinum crucible as a massive matter in pumice form.

TABLE 1

| No. | Compounding Ratio of Material Oxide (wt %) | | | Glass Recovery Percentage | Non-Molten | |
|---|---|---|---|---|---|---|
| | $B_2O_3$ | ZnO | BaO | (wt %) | (wt %) | Visual Appearance Property of Molten Material |
| B1 | 100 | 0 | 0 | 8.6 | 0 | Semitranslucent and White Molten Material |
| B2 | 80 | 20 | 0 | 74.0 | 0 | Phase Separation into Transparent and Colorless Vitrified Portion and White Crystal Portion |

TABLE 1-continued

| No. | Compounding Ratio of Material Oxide (wt %) | | | Glass Recovery Percentage (wt %) | Non-Molten (wt %) | Visual Appearance Property of Molten Material |
| --- | --- | --- | --- | --- | --- | --- |
| | $B_2O_3$ | ZnO | BaO | | | |
| B3 | 60 | 30 | 10 | 80.6 | 0 | Crystal Deposition on Subdued White Vitrified Portion Surface |
| B4 | 40 | 40 | 20 | 78.7 | 0 | Preferable Translucent and Maize Glass |
| B5 | 20 | 50 | 30 | 16.3 | 83.7 | Phase Separation into Maize Molten Material and Pumice Portion |
| B6 | 0 | 60 | 40 | 0 | 100 | The Whole Material is Pumice and Not Vitrified. |
| B7 | 80 | 0 | 20 | 68.7 | 0 | Small Amount of Crystal Deposition on Translucent and Maize Vitrified Portion Surface |
| B8 | 60 | 10 | 30 | 70.0 | 0 | Small Amount of Crystal Deposition on Translucent and Maize Vitrified Portion Surface |
| B9 | 40 | 20 | 40 | 78.7 | 0 | Preferable Translucent and Yellow Glass |
| B10 | 20 | 30 | 50 | 68.7 | 0 | Crystal Deposition on Tawny Vitrified Portion Surface |
| B11 | 0 | 40 | 60 | 0 | 100 | The Whole Material is Pumice and Not Vitrified. |
| B12 | 60 | 40 | 0 | 87.3 | 0 | Phase Separation into Transparent and Colorless Vitrified Portion and White Crystal Portion |
| B13 | 60 | 20 | 20 | 74.7 | 0 | Small Amount of Crystal Deposition on Translucent and Maize Vitrified Portion Surface |
| B14 | 60 | 0 | 40 | 63.9 | 0 | Preferable Translucent and Yellow Glass |
| B15 | 40 | 60 | 0 | 76.7 | 0 | Preferable Transparent and Colorless Glass |
| B16 | 40 | 30 | 30 | 78.7 | 0 | Preferable Translucent and Yellow Glass |
| B17 | 40 | 0 | 60 | 66.7 | 0 | Whitish Bronzed Molten Material having Low Fluidity |
| B18 | 80 | 10 | 10 | 73.3 | 0 | Whitish Bronzed Molten Material having Low Fluidity |
| B19 | 70 | 20 | 10 | 76.0 | 0 | Whitish Bronzed Molten Material having Low Fluidity |
| B20 | 70 | 10 | 20 | 70.0 | 0 | Small Amount of Crystal Deposition on Translucent and Maize Vitrified Portion Surface |
| B21 | 50 | 40 | 10 | 74.7 | 0 | Preferable Translucent and Maize Glass |
| B22 | 50 | 30 | 20 | 82.0 | 0 | Preferable Translucent and Yellow Glass |
| B23 | 50 | 20 | 30 | 78.7 | 0 | Preferable Translucent and Yellow Glass |
| B24 | 50 | 10 | 40 | 74.7 | 0 | Preferable Translucent and Yellow Glass |
| B25 | 40 | 50 | 10 | 78.0 | 0 | Preferable Translucent and Maize Glass |
| B26 | 40 | 10 | 50 | 78.0 | 0 | Preferable Translucent and Dark Maize Glass |
| B27 | 30 | 60 | 10 | 78.7 | 0 | Whitish Bronzed Molten Material |
| B28 | 30 | 50 | 20 | 79.3 | 0 | Preferable Translucent and Yellow Glass |
| B29 | 30 | 40 | 30 | 82.0 | 0 | Preferable Translucent and Yellow Glass |
| B30 | 30 | 30 | 40 | 88.0 | 0 | Preferable Translucent and Yellow Glass |
| B31 | 30 | 20 | 50 | 81.3 | 0 | Preferable Translucent and Dark Maize Glass |
| B32 | 30 | 10 | 60 | 60.7 | 30.3 | Phase Separation into Yellow Vitrified Portion and Whitish Bronzed Crystal Portion |

As shown in Table 1, it is found that the visual appearance property and the glass recovery percentage of a manufactured lead-free glass material changes drastically depending on the glass composition. The visual appearance properties are divided into a state of preferable translucent and yellow glass (B4, B9, B14-B16, B21-B26, B28-B31), a state where crystal is deposited on the surface of vitrified molten material (B3, B7, B8, B10, B13, B20), a state of phase separation into vitrified molten material and a white crystal portion (B2, B12, B32), a state of poor-quality glass (B1, B17-B19, B27), a state where material is hardly vitrified (B5, B6, B11) and the like. Material of a state of preferable translucent glass can be naturally used for sealing and, moreover, even material of a state where crystal is deposited on the surface of vitrified molten material may possibly be used when the deposited amount is small.

[Measurement of Glass Transition Point, Softening Point and Crystallization Starting Temperature]

Figure 3:
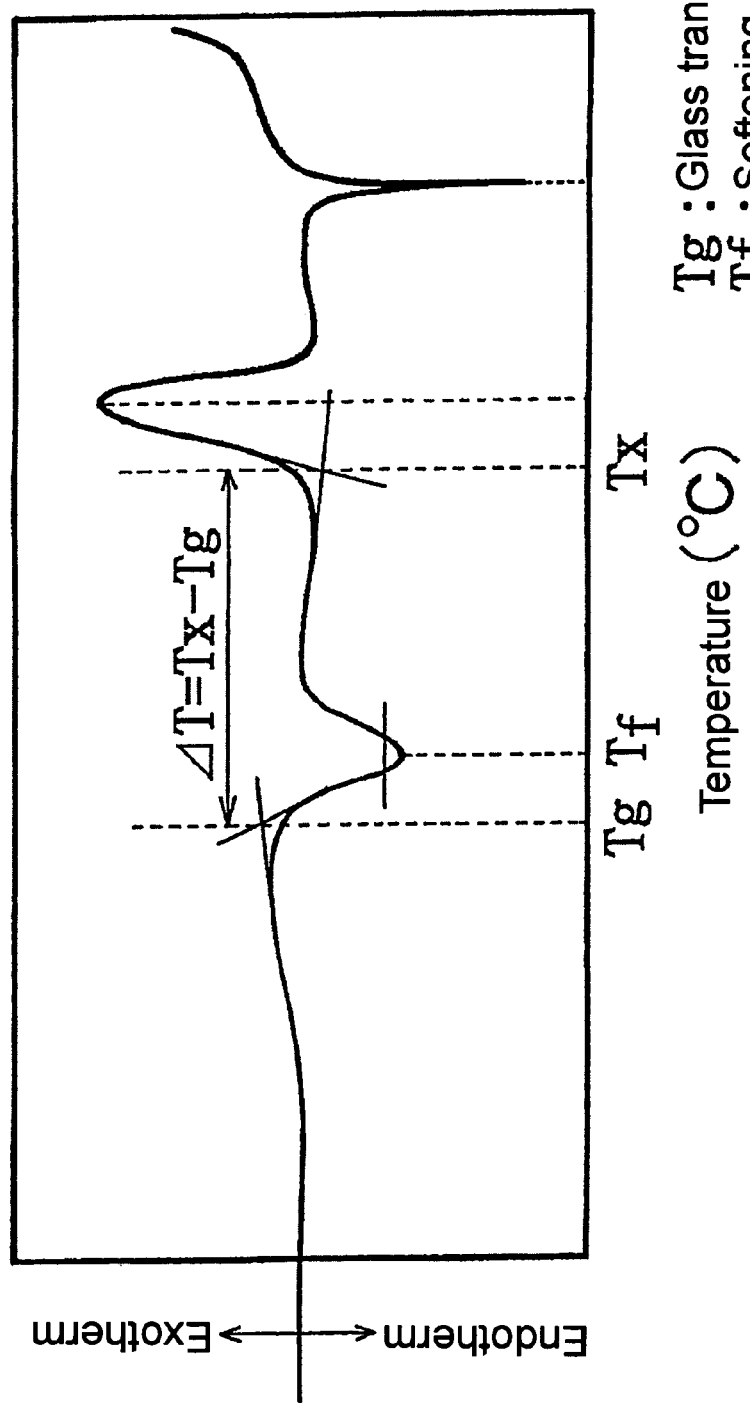
FIG. 3 is a correlation diagram of endotherm/exotherm-temperature in measurement by a differential thermal analysis device.

Regarding the lead-free glass materials B1-B32 manufactured in the above Example 1 and a commercial lead glass material for use in sealing, the glass transition point Tg, the softening point Tf and the crystallization starting temperature Tx were measured with a differential thermal analysis device (DT-40 made by Shimadzu Corporation). The results are shown in Table 2 together with ΔT (Tx−Tg). The arrow (↑) added to the temperature value in the table denotes a value larger than or equal to the temperature value and the sign (−) denotes that identification was impossible. It should be noted that temperature rising measurement of all samples was performed at a rate of temperature rise of 10° C./min from 25° C. to 600° C. and α-$Al_2O_3$ was used as the correlation sample. Moreover, in FIG. 3 which shows the relation between endotherm/exotherm and temperature in measurement by a differential thermal analysis device (DTA), the glass transition point Tg, the softening point Tf and the crystallization starting temperature Tx appear as turning points between endotherm and exotherm as in the curve in the figure.

[X-ray Analysis]

Regarding the lead-free glass materials B1-B32 manufactured in the above Example 1 and a commercial lead glass material for use in sealing, structural analysis was performed at a scan speed of 2 deg/min with a powder X-ray device (Geiger Flex 2013 made by Rigaku Denki Corporation) to check whether the glass texture is amorphous glass or crystallized glass. The results are shown in Table 2 together with the kind of deposited crystal. It should be noted that amorphous glass is preferable for a sealing process. This rests on the fact that a characteristic change due to thermal history is small and it is therefore possible to freely change sealing conditions such as the sealing temperature and time.

Figure 4:
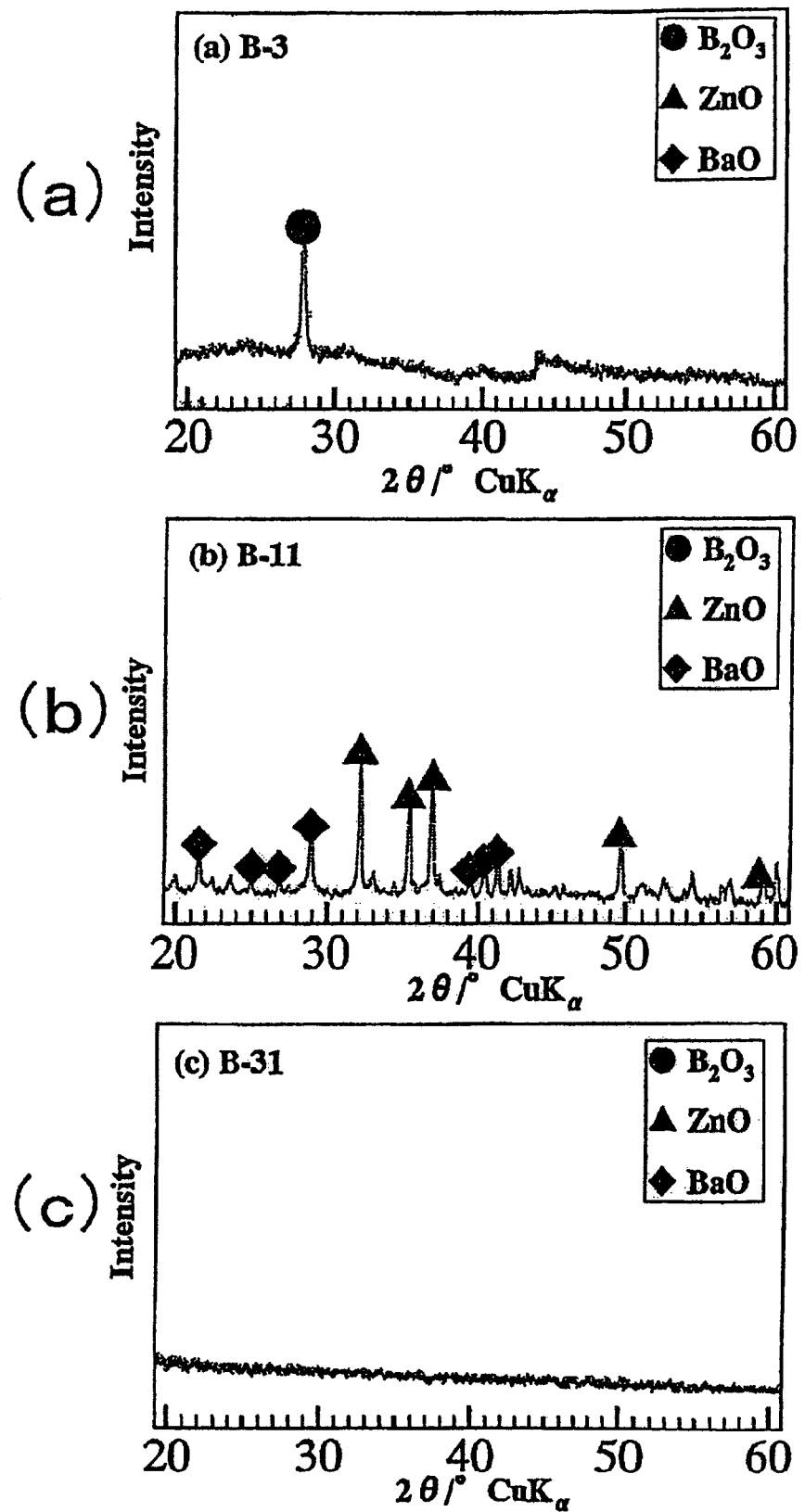
FIG. 4 shows charts of 3 patterns by X-ray structural analysis and, in particular, (a) is a chart of a lead-free glass material B3, (b) is a chart of a lead-free glass material B11 and (c) is a chart of a lead-free glass material B31.

It should be noted that FIG. 4 shows a chart of amorphous glass partially including crystallized glass of the lead-free glass material B3 in (a) of the figure, a chart of crystallized glass of the lead-free glass material B11 in (b) of the same and a chart of amorphous glass of the lead-free glass material B31 in (c) of the same, as X-ray structural analysis charts of three typical patterns. When the content of $B_2O_3$ is large as in the lead-free glass material B3, crystal of $B_2O_3$ is partially deposited. Moreover, for a molten material which cannot be vitrified at all as the lead-free glass material B11, a crystal pattern of each oxide is recognized. For a material which could be vitrified extremely preferably as the lead-free glass material B31, no crystal pattern of each metallic oxide is recognized.

of offering a preferable glass state at a glass transition point lower than or equal to 600° C. is shown in a solid line as a preferable glass range.

It is found from the results in Tables 1 and 2 and FIG. 1 that a glass composition composed of $B_2O_3$ of 20-80% by weight, ZnO of 0-50% by weight and BaO of 0-60% by weight offers a preferable glass state in a lead-free glass material of $B_2O_3$—ZnO—BaO series. A glass composition composed of $B_2O_3$ of 20-40% by weight, ZnO of 0-50% by weight and BaO of 10-60% by weight offers a glass transition point Tg lower than or equal to 540° C. Furthermore, the most preferable glass composition composed of $B_2O_3$ of 20-35% by weight, ZnO of 10-35% by weight and BaO of 40-60% by weight offers a glass transition point Tg lower than 500° C. and a difference ΔT between the crystallization starting temperature Tx and the glass transition point Tg, which gives an indication of the thermal stability, larger than or equal to 80°

TABLE 2

| Glass Material | Tg (° C.) | Tf (° C.) | Tx (° C.) | ΔT (° C.) | X-Ray Analysis | Deposited Crystal |
|---|---|---|---|---|---|---|
| Lead Glass | 302 | 320 | 432 | 130 | Amorphous | None |
| B1 | — | — | — | — | Crystallized | $B_2O_3$ |
| B2 | 600↑ | 600↑ | 600↑ | — | Almost Amorphous | $B_2O_3$ |
| B3 | 562 | 578 | 600↑ | 38↑ | Almost Amorphous | $B_2O_3$ |
| B4 | 540 | 565 | 600↑ | 60↑ | Amorphous | None |
| B5 | 482 | 503 | 575 | 93 | Almost Amorphous | ZnO |
| B6 | — | — | — | — | Crystallized | ZnO, BaO |
| B7 | 600↑ | 600↑ | 600↑ | — | Almost Amorphous | $B_2O_3$ |
| B8 | 564 | 572 | 600↑ | 36↑ | Amorphous | None |
| B9 | 530 | 560 | 600↑ | 70↑ | Amorphous | None |
| B10 | 465 | 485 | 550 | 85 | Amorphous | None |
| B11 | — | — | — | — | Crystallized | ZnO, BaO |
| B12 | 565 | 588 | 600↑ | 35↑ | Almost Amorphous | $B_2O_3$ |
| B13 | 550 | 582 | 600↑ | 50↑ | Amorphous | None |
| B14 | 570 | 592 | 600↑ | 30↑ | Amorphous | None |
| B15 | 557 | 575 | 600↑ | 43↑ | Amorphous | None |
| B16 | 535 | 570 | 600↑ | 65↑ | Amorphous | None |
| B17 | 445 | 450 | 477 | 32 | Almost Amorphous | BaO |
| B18 | 541 | 571 | 600↑ | 59↑ | Crystallized | $B_2O_3$ |
| B19 | 564 | 583 | 600↑ | 36↑ | Crystallized | $B_2O_3$ |
| B20 | 542 | 575 | 600↑ | 58↑ | Almost Amorphous | $B_2O_3$ |
| B21 | 555 | 592 | 600↑ | 45↑ | Amorphous | None |
| B22 | 550 | 587 | 600↑ | 50↑ | Amorphous | None |
| B23 | 554 | 590 | 600↑ | 46↑ | Amorphous | None |
| B24 | 556 | 591 | 600↑ | 44↑ | Amorphous | None |
| B25 | 540 | 583 | 600↑ | 60↑ | Amorphous | None |
| B26 | 525 | 578 | 600↑ | 75↑ | Amorphous | None |
| B27 | 516 | 582 | 600↑ | 84↑ | Crystallized | All Material Oxide |
| B28 | 508 | 538 | 592 | 84 | Amorphous | None |
| B29 | 500 | 534 | 600↑ | 100↑ | Amorphous | None |
| B30 | 485 | 525 | 583 | 98 | Amorphous | None |
| B31 | 480 | 537 | 590 | 110 | Amorphous | None |
| B32 | 477 | 540 | 600↑ | 123↑ | Almost Amorphous | BaO |

In the triangle diagram of FIG. 1, regarding the lead-free glass materials B1-B32 of $B_2O_3$—BaO—ZnO series obtained in the above Example 1, the glass composition (compounding ratio of the material oxide) is shown together with the glass transition point and the vitrification state. The sign ◇ with a number in the figure denotes the glass composition of each number of the lead-free glass materials B1-B32, the numerical value shown below the sign ◇ denotes the glass transition point (° C.) of the glass material and the sign below the numerical value denotes the vitrification state of the glass material with one of three classes added to the figure. Moreover, a range capable of enabling glass recovery in a high yield, which is comparably costly, is shown in the broken line as a recovery limitation glass range and a range capable C. The most superior is a glass composition of the lead-free glass material B31 including $B_2O_3$ of 30% by weight, ZnO of 20% by weight and BaO of 50% by weight, the glass transition point Tg of which is 480° C. which is much higher than that of a lead glass material and ΔT of which is 110° C. comparable to 130° C. of a lead glass material.

Figure 2:
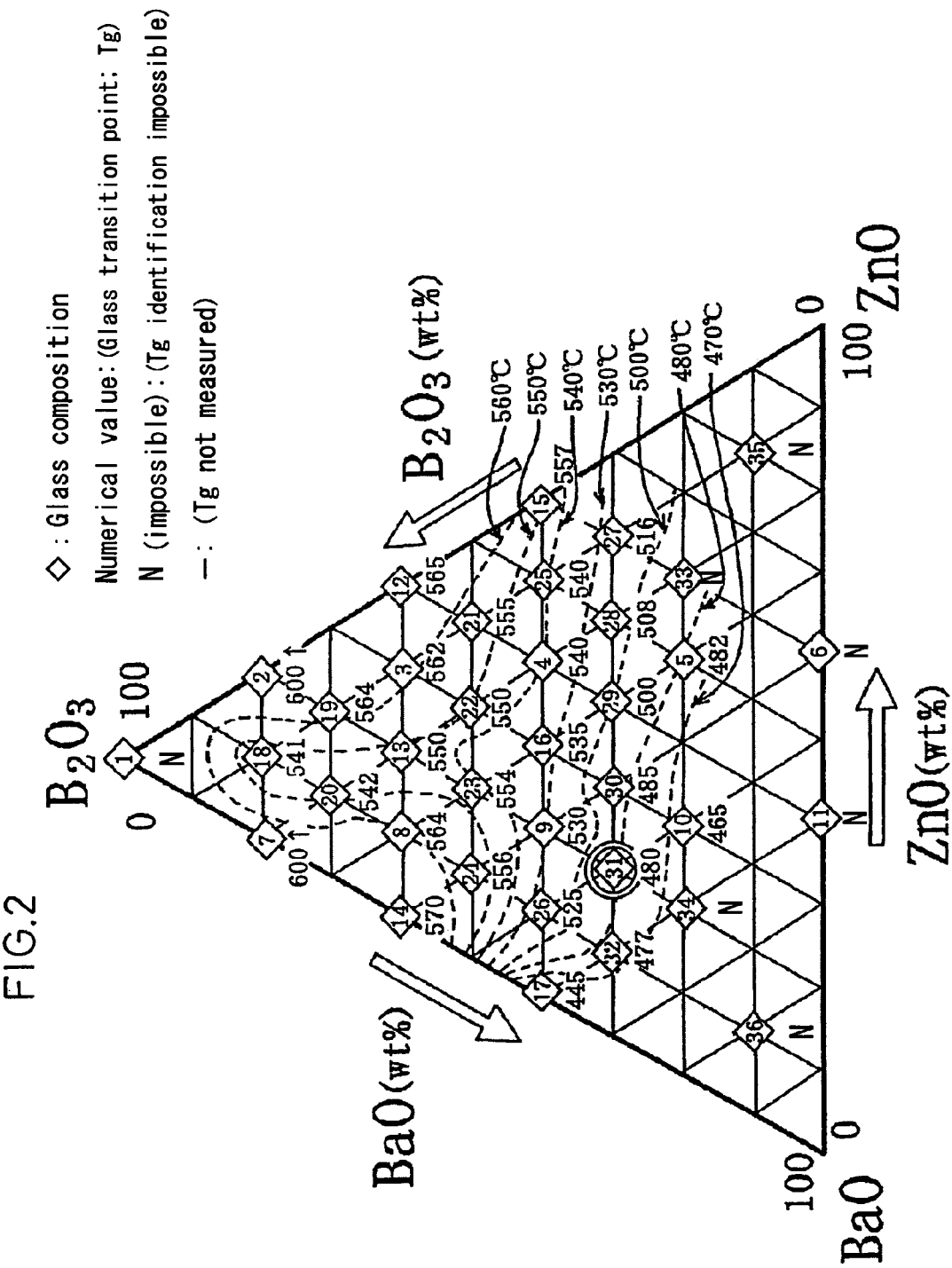
FIG. 2 is a triangle diagram showing the glass compositions of the same lead-free glass materials together with the glass transition points and isothermal curves of the glass transition point.

In the triangle diagram of FIG. 2, the isothermal curves of the glass transition points Tg of the lead-free glass materials B1-B32 of $B_2O_3$—BaO—ZnO series obtained in the above Example 1 are shown in a broken line together with the glass composition (compounding ratio of the material oxide) and the glass transition point Tg. It should be noted that the sign ◇ with number in the figure and the numerical value below the sign ◇ are the same as those of FIG. 1. It is understood from these isothermal curves that the glass transition point tends to rise with an increase in the content of $B_2O_3$.

Figure 5:
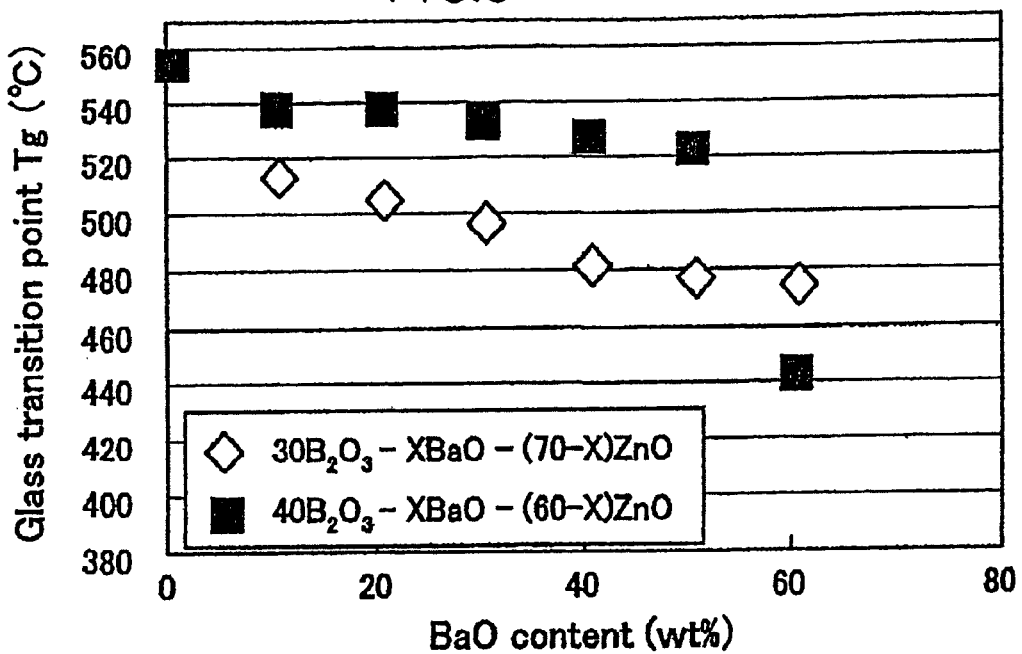
FIG. 5 is a correlation diagram of BaO content-glass transition point of lead-free glass materials of $B_2O_3$—BaO—ZnO series.

FIG. 5 shows the influence of the content of BaO in a lead-free glass material of $B_2O_3$—BaO—ZnO series. Here, materials having $B_2O_3$ of 30% by weight or 40% by weight, i.e. two glass composition series of $30B_2O_3$-xBaO-(70-x)ZnO and $40B_2O_3$-xBaO-(60-x)ZnO (the numeric value denotes % by weight), were selected from the lead-free glass materials B1-B32 obtained in the above Example 1 and the addition effect of BaO was arranged. It is understood from both of the series that the glass transition point tends to lower with an increase in the content of BaO. Moreover, in the series with the content of $B_2O_3$ of 30% by weight, the contribution of BaO as a network-modifier oxide is larger and the lowering of the glass transition point caused by an increase of the content is larger.

Figure 6:
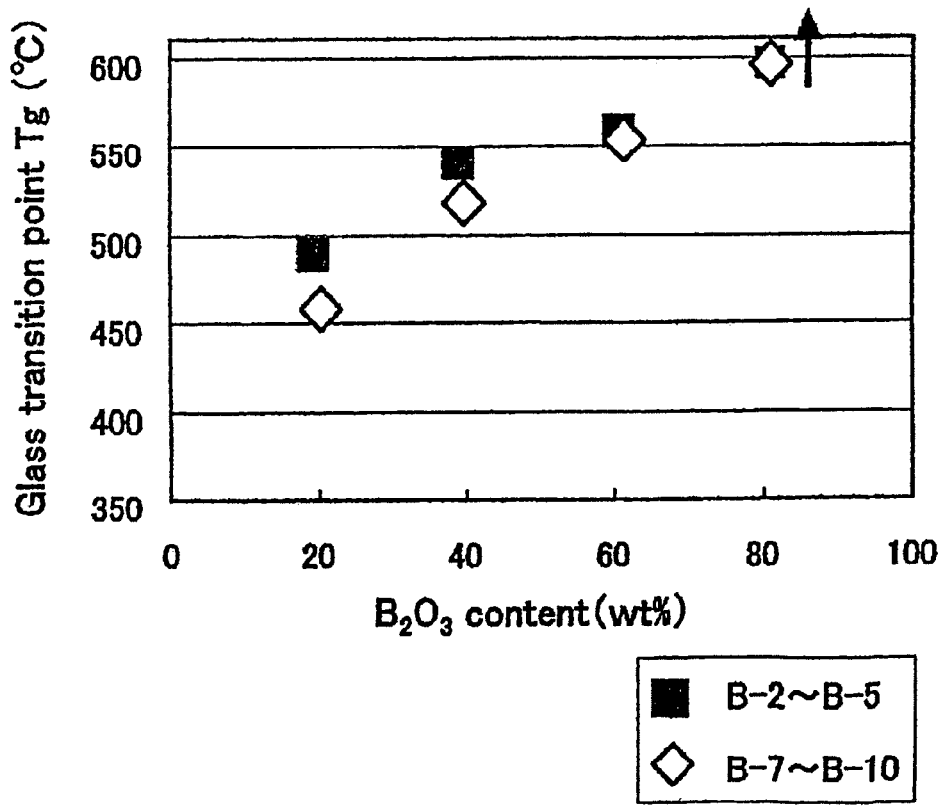
FIG. 6 is a correlation diagram of $B_2O_3$ content-glass transition point of lead-free glass materials of $B_2O_3$—BaO—ZnO series.

Furthermore, FIG. 6 shows the influence of the content of $B_2O_3$ in a lead-free glass material of $B_2O_3$—BaO—ZnO series. Here, two series of B2-B5 and B7-B10 were arranged and it is understood from the result that the glass transition point tends to rise monotonically due to an increase in the content of $B_2O_3$.

[Measurement of Thermal Expansion Coefficient]

From measurement of a thermal expansion coefficient of the lead-free glass material B31 in the above Example 1 using a thermomechanical analysis device (TMA 8310 made by Rigaku Denki Corporation), the obtained result was approximately $50 \times 10^{-6}/°$ C. It should be noted that the measurement sample used for this measurement was prepared by melting lead-free glass material powder again and shaping this into a square pole of 5×5×20 mm (length×width×height) having the upper face parallel to the bottom face and the measurement was performed with rise in temperature from 25° C. to 200° C. at a rate of 5° C./min to find out the mean thermal expansion coefficient α. Moreover, α-$Al_2O_3$ was used as the correlation sample.

The thermal expansion coefficient of a sealing material is required to be low since glass is a fragile material and it is necessary to prepare a strong sealing body by adjusting the thermal expansion coefficient of glass and that of a sealed body to each other to control the stress of the sealing portion as described above. In view of this, it is found that the thermal expansion coefficient of the lead-free glass material B31 of approximately $50 \times 10^{-6}/°$ C. is a value extremely lower than the thermal expansion coefficient of a commonly-used lead glass of approximately $100 \times 10^{-6}/°$ C. and the lead-free glass material B31 is superior as a sealing material by that much.

[Sealing Test 1]

Figure 9:
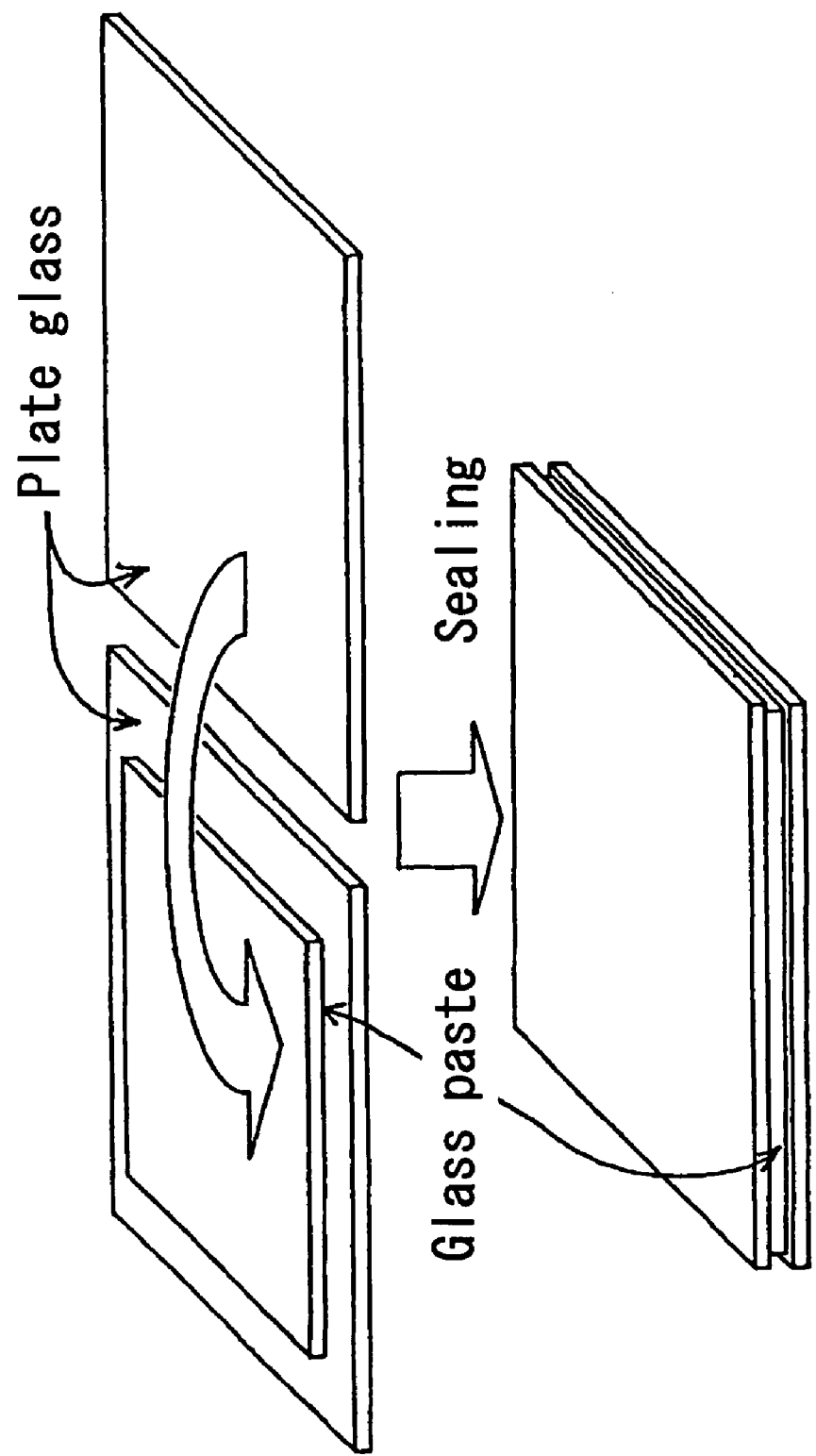
FIG. 9 is a perspective view showing a sealing method of a plate glass by Sealing Test 1.

Thinner solution of ethyl cellulose was added to powder of the lead-free glass material B31 of the Example 1, the mixture was kneaded sufficiently to prepare glass paste, one side of a plate glass was uniformly coated with the glass paste as shown in FIG. 9 and tentative burning was performed for the plate glass in an electric furnace at around the glass transition point (480° C.) for thirty minutes. Then, a plate glass without glass paste was superposed on the plate glass taken out of the electric furnace, fixed with a clip and put into the electric furnace again and main burning was performed at a constant temperature around the softening point (537° C.) for sixty minutes. As a result, it was found that flaking or a crack due to the stress is not generated at the sealing portion and the sealing portion can ensure sufficient airtightness as one for a plane fluorescent display plate.

Example 2

A mixture (total amount of 15 g) of $V_2O_5$ powder, ZnO powder and BaO powder as the material oxide at a ratio (% by weight) described in the following Table 3 was housed in a platinum crucible and burned in an electric furnace at approximately 1000° C. for 60 minutes, the obtained molten material was cast into an alumina boat to create a glass rod, the glass rod was cooled in the atmosphere, then grinded similarly to the Example 1 and classified to collect powder having a grain size smaller than or equal to 100 µm, and lead-free glass materials V1-V34 were manufactured.

Regarding these lead-free glass materials V1-V34, the glass transition point Tg, the softening point Tf and the crystallization starting temperature Tx were measured similarly to Example 1 and the glass texture was checked by X-ray structural analysis. The results are shown in Table 3 together with ΔT (Tx−Tg) and the kind of the deposited crystal. It should be noted that the sign (−) in each column of Tg, Tf and Tx in Table 3 denotes that identification was impossible and the sign (×) denotes that recovery as glass was impossible. Moreover, the sign (−) in the column of the X-ray analysis and the deposited crystal denotes that no measurement was performed.

TABLE 3

| No. | Compounding Ratio of Material Oxide (wt %) | | | Tg (° C.) | Tf (° C.) | Tx (° C.) | ΔT (° C.) | X-Ray Analysis | Deposited Crystal |
|---|---|---|---|---|---|---|---|---|---|
| | $V_2O_5$ | ZnO | BaO | | | | | | |
| V1 | 100 | 0 | 0 | — | — | — | — | Crystallized | $V_2O_5$ |
| V2 | 80 | 20 | 0 | — | — | — | — | Crystallized | — |
| V3 | 60 | 10 | 10 | — | — | — | — | Crystallized | — |
| V4 | 40 | 40 | 20 | 345 | 380 | 435 | 90 | Amorphous | None |
| V5 | 20 | 50 | 30 | — | — | — | — | Crystallized | — |
| V6 | 0 | 60 | 40 | x | x | x | x | — | — |
| V7 | 80 | 0 | 20 | 370 | 380 | 500 | 130 | Almost Amorphous | — |
| V8 | 60 | 10 | 30 | 265 | 310 | 370 | 105 | Amorphous | None |
| V9 | 40 | 20 | 40 | 320 | 335 | 420 | 100 | Amorphous | None |
| V10 | 20 | 30 | 50 | — | — | — | — | Crystallized | — |
| V11 | 0 | 40 | 60 | x | x | x | x | — | — |
| V12 | 60 | 40 | 0 | — | — | — | — | Crystallized | — |
| V13 | 60 | 20 | 20 | 370 | 415 | 450 | 80 | Amorphous | None |

TABLE 3-continued

| No. | Compounding Ratio of Material Oxide (wt %) | | | Tg (° C.) | Tf (° C.) | Tx (° C.) | ΔT (° C.) | X-Ray Analysis | Deposited Crystal |
|---|---|---|---|---|---|---|---|---|---|
| | $V_2O_5$ | ZnO | BaO | | | | | | |
| V14 | 60 | 0 | 40 | 355 | 385 | 430 | 75 | Amorphous | None |
| V15 | 40 | 60 | 0 | — | — | — | — | Crystallized | — |
| V16 | 40 | 30 | 30 | 270 | 310 | 325 | 55 | Amorphous | None |
| V17 | 40 | 0 | 60 | x | x | x | x | — | — |
| V18 | 80 | 10 | 10 | — | — | — | — | Crystallized | — |
| V19 | 70 | 20 | 10 | 265 | 285 | 315 | 50 | Almost Amorphous | — |
| V20 | 70 | 10 | 20 | 260 | 290 | 320 | 60 | Amorphous | None |
| V21 | 50 | 40 | 10 | 380 | 410 | 435 | 55 | Crystallized | — |
| V22 | 50 | 30 | 20 | 330 | 355 | 375 | 45 | Almost Amorphous | — |
| V23 | 50 | 20 | 30 | 260 | 275 | 295 | 35 | Amorphous | None |
| V24 | 50 | 10 | 40 | 330 | 380 | 420 | 90 | Amorphous | None |
| V25 | 40 | 50 | 10 | 220 | 230 | 320 | 100 | Crystallized | — |
| V26 | 40 | 10 | 50 | 330 | 315 | 380 | 50 | Amorphous | None |
| V27 | 30 | 60 | 10 | 320 | 345 | 405 | 85 | Crystallized | — |
| V28 | 30 | 50 | 20 | x | x | x | x | — | — |
| V29 | 30 | 40 | 30 | x | x | x | x | — | — |
| V30 | 30 | 30 | 40 | x | x | x | x | — | — |
| V31 | 30 | 20 | 50 | x | x | x | x | — | — |
| V32 | 30 | 30 | 60 | x | x | x | x | — | — |
| V33 | 50 | 20 | 0 | x | x | x | x | — | — |
| V34 | 50 | 0 | 50 | 340 | 380 | 395 | 55 | Almost Amorphous | $V_2O_5$ |

Figure 7:
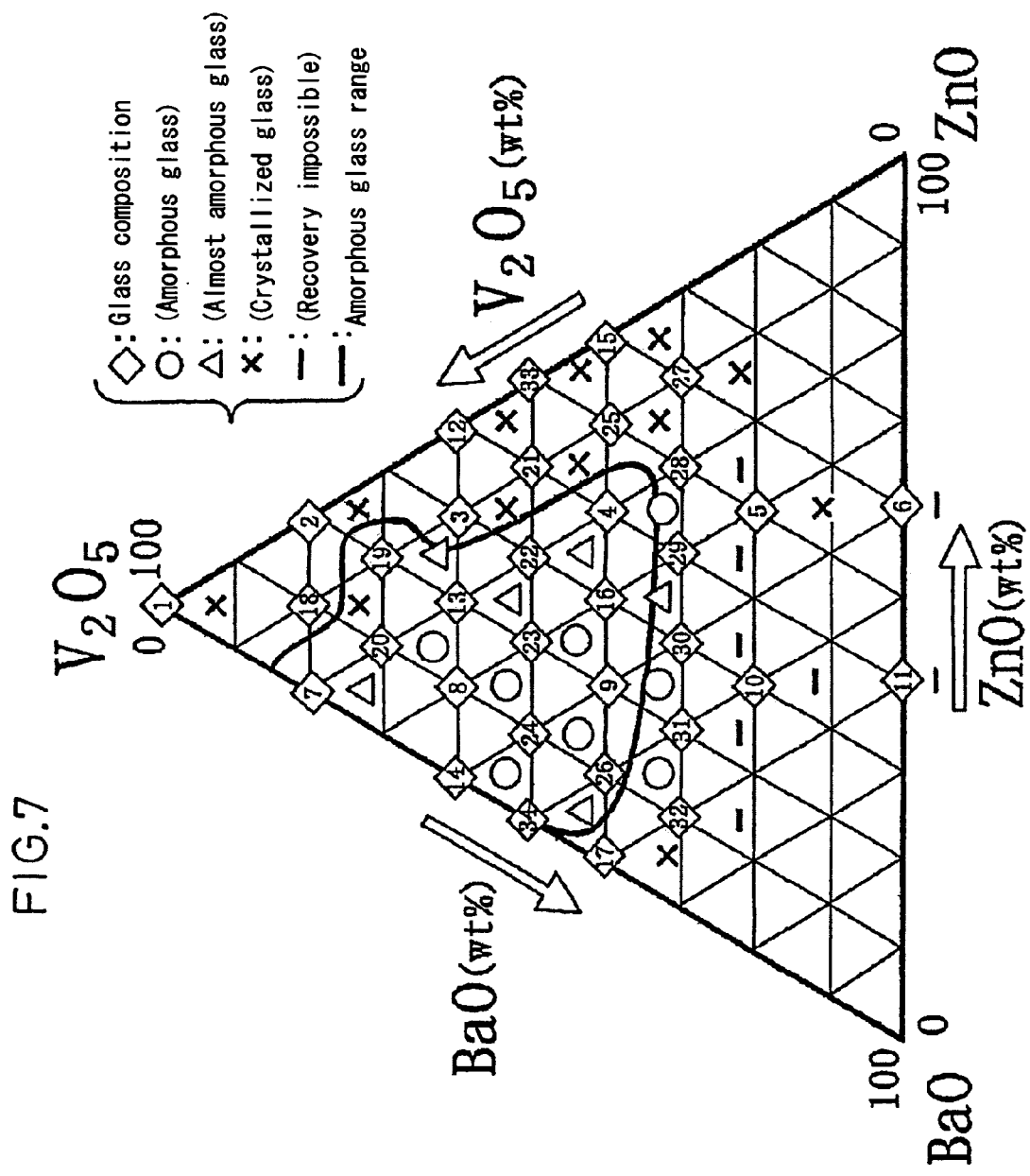
FIG. 7 is a triangle diagram showing the glass compositions of lead-free glass materials of $V_2O_5$—BaO—ZnO series manufactured in Example 2 together with the vitrification states.
Figure 8:
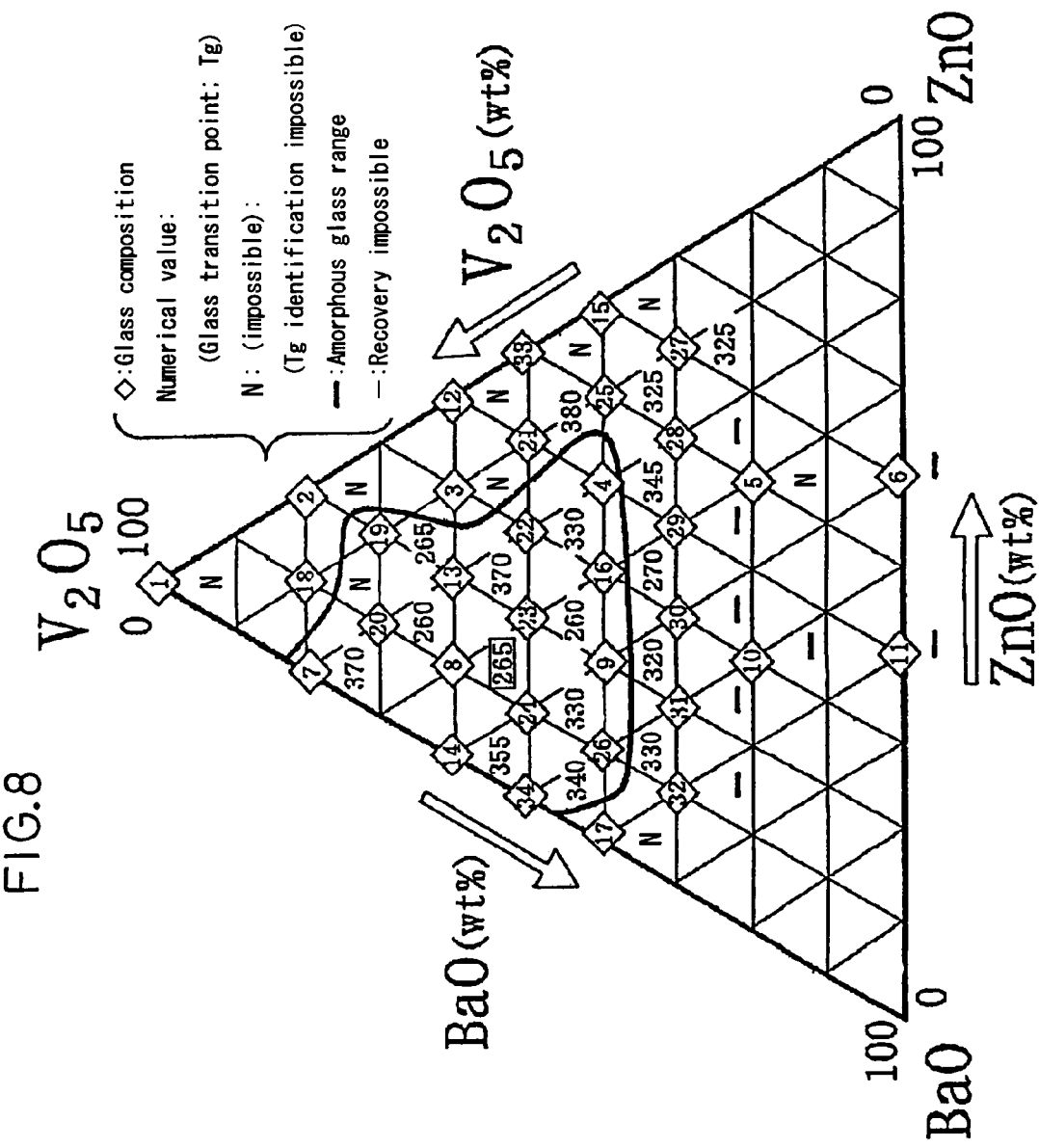
FIG. 8 is a triangle diagram showing the glass compositions of the same lead-free glass materials together with the glass transition points.

The triangle diagrams of FIG. 7 and FIG. 8 show the glass compositions of the lead-free glass materials V1-V34 of $V_2O_5$—BaO—ZnO series obtained in the Example 2 together with the glass transition points and the vitrification states. The sign ◇ with a number in the figures denotes the composition of glass of each number of lead-free glass materials V1-V34, the sign shown below the sign ◇ in FIG. 7 denotes the vitrification state of the glass material with one of three classes added to the figure and the sign (−) denotes that recovery was impossible. Moreover, a range capable of offering a preferable glass state is shown in a solid line as an amorphous glass range.

It is found from Table 3 and FIGS. 7 and 8 that a glass composition composed of $V_2O_5$ of 30-80% by weight, ZnO of 0-50% by weight and BaO of 10-60% by weight offers a preferable glass state in a lead-free glass material of $V_2O_5$—ZnO—BaO series. In particular, it is indicated that extremely preferable sealing processability is obtained in a glass composition composed of $V_2O_5$ of 25-75% by weight, ZnO of 0-45% by weight and BaO of 15-55% by weight since the crystallization starting temperature Tx is as low and lower than or equal to 500° C. and the glass transition point Tg and the softening point Tf are as low and lower than or equal to 400° C.

Example 3

$B_2O_3$ powder of 20 part by weight, $V_2O_5$ powder of 10 part by weight, ZnO powder of 20 part by weight and BaO powder of 50 part by weight were mixed as the material oxide, and burning, creation of a glass rod, grinding after cooling and classifying were performed similarly to Example 1 to manufacture a lead-free glass material BV. Here, the molten material after burning was of a tawny vitriform and preferable fluidity and preferable visual appearance were offered. Then, when the glass transition point Tg, the softening point Tf, the crystallization starting temperature Tx and the thermal expansion coefficient of this lead-free glass material BV were measured similarly to Example 1 and the glass texture was checked by X-ray structural analysis, the following result was obtained.

[Characteristic of Lead-Free Glass Material BV]

Glass Transition Point Tg . . . 450° C.

Softening Point Tf . . . 465° C.

Crystallization Starting Temperature Tx . . . 550° C.

Thermal Stability ΔT . . . 100° C.

Thermal Expansion Coefficient . . . $98 \times 10^{-7}$/° C.

Glass Texture . . . Amorphous

It is found from the result of the above Example 3 that, even when both of $B_2O_3$ and $V_2O_5$ are used as the network-former oxide, the glass transition point Tg is low, the thermal stability is preferable and the thermal expansibility is low as long as the compounding ratio of the material oxide is within an appropriate range and a lead-free glass material having sufficient performance as a sealing material is obtained.

Example 4

A mixture (total amount of 15 g) of $B_2O_3$ powder, ZnO powder, BaO powder and $Bi_2O_3$ powder or $TeO_2$ powder as the material oxide at a ratio (% by weight) described in the following Table 4 was burned similarly to Example 1, and creation of a glass rod, grinding after cooling and classifying were performed to manufacture lead-free glass materials B33 and B34. Then the glass transition point Tg, the softening point Tf and the crystallization starting temperature Tx of these lead-free glass materials B33 and B34 were measured similarly to Example 1. The results are shown in Table 4 together with ΔT (Tx−Tg). It should be noted that the lead-free glass material B34 was manufactured twice with the same material powder and at the same compounding ratio and the crystallization starting temperature Tx for each was measured.

TABLE 4

| Lead-Free Glass Material No. | Compounding Ratio of Material Oxide (wt %) | | | | | Tg (° C.) | Tf (° C.) | Tx (° C.) | ΔT (° C.) |
|---|---|---|---|---|---|---|---|---|---|
| | $B_2O_3$ | ZnO | BaO | $Bi_2O_3$ | $TeO_2$ | | | | |
| B33 | 30 | 20 | 50 | 200 | — | 371 | 411 | 600↑ | 229↑ |
| B34 | 30 | 20 | 50 | — | 200 | 366 | 410 | 524 | 158 |
| | | | | | | | | 560 | 194 |

As shown in Table 4, it is found that both of the lead-free glass materials B33 and B34 are extremely suitable for use in sealing since the glass transition point Tg is as low as 371° C. and 366° C., the softening point Tf is also as low as 411° C. and 410° C. and ΔT which gives an indication of the thermal stability is larger than or equal to 158-229° C. and very large. It should be noted that the molten material of both of the lead-free glass materials B33 and B34 was in a preferable amorphous vitriform and was superior in visual appearance and fluidity.

Example 5

A mixture (total amount of 15 g) of $V_2O_5$ powder, ZnO powder, BaO powder and $TeO_2$ powder as the material oxide at a ratio (part by weight) described in the following Table 5 was burned similarly to Example 1, and creation of a glass rod, grinding after cooling and classifying were performed to manufacture lead-free glass materials V35-V37 of a quaternary system of $V_2O_5$—ZnO—BaO—$TeO_2$. It should be noted that all of the glass recovery percentages after burning were larger than or equal to 70%.

Example 6

A mixture of $V_2O_5$ powder, ZnO powder and BaO powder as the material oxide at a ratio (part by weight) described in the following Table 5 was burned similarly to Example 1, and creation of a glass rod, grinding after cooling and classifying were performed to obtain lead-free glass material powder of a ternary system of $V_2O_5$—ZnO—BaO. Then $TeO_2$ powder was mixed with each lead-free glass material powder at a ratio (part by weight) described in the following Table 5, the mixture powder was burned again, and creation of a glass rod, grinding after cooling and classifying were performed to manufacture lead-free glass materials V38-V40 of a quaternary system of $V_2O_5$—ZnO—BaO—$TeO_2$. It should be noted that all of the glass recovery percentages at the stage after burning after mixing of $TeO_2$ powder were larger than or equal to 70%.

Regarding the lead-free glass materials V35-V40 obtained in the above Examples 5 and 6, the glass transition point Tg, the softening point Tf, the crystallization starting temperature Tx, ΔT (Tx−Tg), the thermal expansion coefficient and the glass texture by X-ray analysis were checked. The results are shown in Table 5 together with fluidity and visible appearance of the molten material. It should be noted that the characteristic of the lead-free glass material V8 of the above Example 2 is also shown in the table for comparison.

TABLE 5

| | | | Example 5 | | | Example 6 | | |
|---|---|---|---|---|---|---|---|---|
| Lead-Free Glass Material No. | | V8 | V35 | V36 | V37 | V38 | V39 | V40 |
| Compounding Ratio of | $V_2O_5$ | 60 | 54 | 48 | 42 | 54 | 48 | 42 |
| Material Oxide | ZnO | 10 | 9 | 8 | 7 | 9 | 8 | 7 |
| (wt %) | BaO | 30 | 27 | 24 | 21 | 27 | 24 | 21 |
| | $TeO_2$ | 0 | 10 | 20 | 30 | 10 | 20 | 30 |
| Glass Transition Point Tg (° C.) | | 280 | 290 | 291 | 285 | 298 | 280 | 293 |
| Softening Point Tf (° C.) | | 310 | 310 | 311 | 310 | 312 | 310 | 320 |
| Crystallization Starting Temperatare Tx (° C.) | | 381 | 392 | 415 | 427 | 400 | 409 | 430 |
| Thermal Stability ΔT (° C.) | | 101 | 102 | 124 | 142 | 102 | 129 | 139 |
| Thermal Expansion Coefficient (×$10^{-7}$/° C.) | | 108.0 | 154.9 | 133.1 | 172.8 | 121.8 | 119.9 | 135.1 |

As shown in Table 5, it is found that all of the lead-free glass materials V35-V40 are greenish black amorphous glass and are extremely suitable for use in sealing since the glass transition point Tg is lower than 300° C., ΔT which gives an indication that the thermal stability is larger than 100° C. and preferable fluidity is offered. Moreover, as indicated from the contrast between Example 5 and Example 6, a large characteristic difference is not generated between a case where $TeO_2$ powder as the fourth ingredient is preliminarily mixed with other material oxide powder and then vitrified and a case where $TeO_2$ powder is subsequently mixed with glass powder which is obtained from other material oxide, burned again and vitrified.

Example 7

$Al_2O_3$ powder of 10 part by weight was mixed as a refractory filler with powder of the lead-free glass material V8 obtained in Example 2 of 100 part by weight and this mixture powder was burned and grinded to manufacture a lead-free glass material V41 including a refractory filler. Regarding this lead-free glass material V41, the glass transition point Tg, the softening point Tf, the crystallization starting temperature Tx, ΔT (Tx−Tg), the thermal expansion coefficient and fluidity were checked. The results are shown in the following Table 6 together with the characteristic of the lead-free glass material V8.

TABLE 6

| Lead-Free Glass Material No. | Compounding Quantity (Parts by Weight) | | Tg (°C.) | Tf (°C.) | Tx (°C.) | ΔT (°C.) | Thermal Expansion Coefficient (×10⁻⁷/°C.) | Fluidity |
|---|---|---|---|---|---|---|---|---|
| | Glass Powder | Al₂O₃ | | | | | | |
| V8 | 100 | 0 | 265 | 310 | 370 | 105 | 101.9 | Preferable |
| V41 | 100 | 10 | 260 | 310 | 400 | 140 | 91.8 | Preferable |

As shown in Table 6, it is found that the lead-free glass material V41 including the refractory filler comprises superior thermal stability, a small thermal expansion coefficient and superior performance as a sealing material in comparison with the lead-free glass material V8 of series without a refractory filler.

Example 8

The lead-free glass material V40 obtained in Example 6 of 60 part by weight and zircon powder as a refractory filler of 40 part by weight were mixed to manufacture a lead-free glass material including a refractory filler. This lead-free glass material had a thermal expansion coefficient of approximately $72.5 \times 10^{-7}/°C.$ which is suitable for sealing and junction of soda lime glass.

[Sealing Test 2]

Thinner solution of ethyl cellulose was added to powder of the lead-free glass material including the refractory filler obtained in Example 8, the mixture was kneaded sufficiently to prepare glass paste (viscosity of 1050 dPa·s), the circumferential edge of a rectangular case made of soda lime glass of a fluorescent display package was coated with the glass paste as shown in FIG. 10, one side of a cover plate made of soda lime glass of the fluorescent tube package excluding the circumference was coated with a fluorescent material and five portions of the circumference were coated with the above glass paste. Tentative burning was performed for these rectangular case and cover plate in an electric furnace according to a temperature profile shown in FIG. 11(a). The rectangular case and the cover plate taken out of the electric furnace were assembled into a package form with two metal electrode wires and one exhaust tube being sandwiched therebetween as shown in FIG. 10 and loaded in the electric furnace again with the assembly package being held by a clip, main burning was performed according to a temperature profile shown in FIG. 11(b) and the rectangular case and the cover plate were sealed uniformly with metal electrode wires and exhaust tube to manufacture a fluorescent display package.

[Lighting Test]

Using the fluorescent display package manufactured in the above Sealing Test 2, the inside thereof was deaerated to a degree of vacuum higher than or equal to $10^{-6}$ Torr by a vacuum pump through the exhaust tube on heating to 350° C., Xe—Ar as discharge gas was introduced into inside thereof so that the discharge gas pressure became 40 Torr and the exhaust tube was sealed. When lighting of this fluorescent display package was respectively checked immediately after sealing, 72 hours after sealing, 168 hours after sealing and 134 hours after sealing with an input power of approximately 0.6 W by an inverter, a preferable lightning state was obtained at all stages. Accordingly, it was proven that reliable sealing of a vacuum package is realized with a lead-free glass material for use in sealing of the present invention.

The invention claimed is:

1. The lead-free glass material for use in sealing which has a glass composition composed of $V_2O_5$ of 25-75% by weight, ZnO of 0-45% by weight and BaO of 15-55% by weight.

2. A lead-free glass material for use in sealing, which has a glass composition consisting essentially of (A) 1-60 parts by weight of one or both of $TeO_2$ and $Bi_2O_3$ and (B) 100 parts by weight of said composition being an oxide consisting essentially of 25-75% by weight $V_2O_5$, 0-45% by weight ZnO and 15-55% by weight BaO.

3. A lead-free glass material for use in sealing consisting essentially of a refractory filler mixed with glass powder, said glass powder consisting essentially of $V_2O_5$ of 25-75% by weight, ZnO of 0-45% by weight and BaO of 15-55% by weight.

4. The lead-free glass material for use in sealing according to claim 3, wherein the refractory filler is at least one kind of low-expansion ceramic powder selected from cordierite, zirconyl phosphate, β-eucryptite, β-spodumene, zircon, alumina, mullite, silica, β-quartz solid solution, zinc silicate and aluminum titanate, and the compounding quantity of said refractory filler is less than or equal to 150 part by weight for said glass powder of 100 part by weight.

5. A lead-free glass powder paste for use in sealing consisting essentially of $V_2O_5$ of 25-75% by weight, ZnO of 0-45% by weight and BaO of 15-55% by weight.

6. A lead-free glass mixed powder paste for use in sealing including a refractory filler added to a glass powder paste, said glass powder paste consisting essentially of $V_2O_5$ of 25-75% by weight, ZnO of 0-45% by weight and BaO of 15-55% by weight.

7. A lead-free glass powder paste for use in sealing consisting essentially of (A) 1-60 parts by weight of one or both of $TeO_2$ and $Bi_2O_3$ and (B) 100 parts by weight of said paste being an oxide consisting essentially of 25-75% by weight $V_2O_5$, 0-45% by weight ZnO and 15-55% by weight BaO.

8. A lead-free glass mixed powder paste for use in sealing including a refractory filler added to a glass powder paste, said glass powder paste consisting essentially of (A) 1-60 parts by weight of one or both of $TeO_2$ and $Bi_2O_3$ and (B) 100 parts by weight of said paste being an oxide consisting essentially of 25-75% by weight $V_2O_5$, 0-45% by weight ZnO and 15-55% by weight BaO.

* * * * *